US011115344B2

(12) United States Patent
Greenstein et al.

(10) Patent No.: US 11,115,344 B2
(45) Date of Patent: Sep. 7, 2021

(54) COMPUTERIZED METHODS AND SYSTEMS FOR MIGRATING CLOUD COMPUTER SERVICES

(71) Applicant: ORACLE INTERNATIONAL CORPORATION, Redwood Shores, CA (US)

(72) Inventors: Paul G. Greenstein, Hopkinton, MA (US); Michael J. Carlson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 16/272,060

(22) Filed: Feb. 11, 2019

(65) Prior Publication Data
US 2020/0007457 A1 Jan. 2, 2020

Related U.S. Application Data

(60) Provisional application No. 62/690,528, filed on Jun. 27, 2018.

(51) Int. Cl.
*H04L 12/911* (2013.01)
*H04L 12/803* (2013.01)

(52) U.S. Cl.
CPC ............ *H04L 47/70* (2013.01); *H04L 47/125* (2013.01)

(58) Field of Classification Search
USPC ....................................................... 709/226
See application file for complete search history.

(56) References Cited

U.S. PATENT DOCUMENTS 6,324,580 B1 * 11/2001 Jindal ..................... G06F 9/505
709/228
7,383,405 B2 6/2008 Vega et al.
(Continued)

FOREIGN PATENT DOCUMENTS

CN 102629207 A 8/2012
CN 102655503 B 9/2015

OTHER PUBLICATIONS

Rolia et al., A Capacity Management Service for Resource Pools, ACM Digital Library, pp. 1-2, downloaded on Jan. 25, 2018 from: https://dl.acm.org/citation.cfm?id=1071047.
(Continued)

*Primary Examiner* — Hermon Asres
(74) *Attorney, Agent, or Firm* — Kraguljac Law Group, LLC

(57) ABSTRACT

Systems, methods, and other embodiments associated with migrating instances of services are described. In one embodiment, a method includes maintaining a first zone of computing resources used to host an instance of a service. The example method may also include routing access requests to the instance. The example method may also include constructing a pre-provisioned instance of the service within a second zone. The pre-provisioned instance comprises a computing environment of computing resources of the second zone and executable code of an application stack of the service. The example method may also include provisioning the pre-provision instance as a migrated instance by executing the executable code of the application stack in response to a request to migrate the instance. The example method may also include routing subsequent access requests to the migrated instance.

14 Claims, 11 Drawing Sheets

(56) References Cited

U.S. PATENT DOCUMENTS

| | | |
|---|---|---|
| 8,046,767 B2 | 10/2011 | Rolia et al. |
| 8,316,130 B2 | 11/2012 | Breiter et al. |
| 8,463,908 B2 | 6/2013 | Murray et al. |
| 8,595,722 B2 | 11/2013 | Gupta et al. |
| 8,639,793 B2 | 1/2014 | Kapur et al. |
| 9,069,590 B2 | 6/2015 | Gupta |
| 9,141,487 B2 | 9/2015 | Jagtiani et al. |
| 9,152,405 B2 | 10/2015 | Gupta et al. |
| 9,189,259 B2 | 11/2015 | Anderson et al. |
| 9,250,944 B2 | 2/2016 | Anderson et al. |
| 9,251,349 B2 | 2/2016 | Haikney et al. |
| 9,253,114 B2 | 2/2016 | Anderson et al. |
| 9,285,196 B2 | 2/2016 | Dettori et al. |
| 9,361,092 B1 | 6/2016 | Bai et al. |
| 9,396,220 B2 | 7/2016 | Li et al. |
| 9,405,530 B2 | 8/2016 | Islam et al. |
| 9,471,350 B2 | 10/2016 | Pavlas et al. |
| 9,569,259 B2 | 2/2017 | Fries et al. |
| 9,582,319 B2 | 2/2017 | Ayala et al. |
| 9,606,826 B2 | 3/2017 | Ghosh et al. |
| 9,705,820 B2 | 7/2017 | Madduri et al. |
| 9,712,503 B1 | 7/2017 | Ahmed et al. |
| 9,736,252 B2 | 8/2017 | Ferris et al. |
| 9,755,990 B2 | 9/2017 | Vicaire |
| 9,779,126 B2 | 10/2017 | Tu et al. |
| 2007/0147306 A1* | 6/2007 | Halpern ............ G06F 11/2025 370/331 |
| 2007/0220121 A1* | 9/2007 | Suwarna ............ H04L 67/1097 709/220 |
| 2008/0022284 A1 | 1/2008 | Cherkasova et al. |
| 2010/0281285 A1 | 11/2010 | Blanding |
| 2012/0284712 A1* | 11/2012 | Nimmagadda ....... G06F 9/5077 718/1 |
| 2013/0159453 A1 | 6/2013 | McLean |
| 2015/0088586 A1* | 3/2015 | Pavlas ................ G06F 9/45558 705/7.25 |
| 2015/0286507 A1 | 10/2015 | Elmroth et al. |
| 2015/0372938 A1 | 12/2015 | Patel et al. |
| 2015/0372941 A1 | 12/2015 | Patel et al. |
| 2016/0142485 A1* | 5/2016 | Mitkar ................ G06F 16/128 707/681 |
| 2016/0162317 A1* | 6/2016 | Doherty ............... G06F 11/30 718/1 |
| 2016/0378524 A1 | 12/2016 | Gough et al. |
| 2017/0116207 A1 | 4/2017 | Lee et al. |
| 2017/0116213 A1 | 4/2017 | Jain et al. |
| 2017/0116249 A1 | 4/2017 | Ravipati et al. |
| 2017/0116298 A1 | 4/2017 | Ravipati et al. |
| 2017/0116334 A1 | 4/2017 | Kruglikov et al. |
| 2017/0187806 A1 | 6/2017 | Wang et al. |
| 2018/0075041 A1 | 3/2018 | Susairaj et al. |
| 2018/0075044 A1 | 3/2018 | Kruglikov et al. |

OTHER PUBLICATIONS

De et al., Caching Techniques for Rapid Provisioning of Virtual Servers in Cloud Environment, IEEE Conference Publication, pp. 1-3, downloaded Jan. 24, 2018 from: http://ieeexplore.ieee.org/document/6211956/.

De et al., Caching VM Instances for Fast VM Provisioning: A Comparative Evaluation; IBM Research India, pp. 1-11, downloaded on Mar. 9, 2018 from: https://www3.cs.stonybrook.edu/~prade/MyPubs/2012-europar.pdf.

Bankole et al., Predicting Cloud Resource Provisioning Using Machine Learning Techniques; IEEE Xplore Digital Library, pp. 1-2, downloaded on Mar. 9, 2018 from: http://ieeexplore.ieee.org/document/6567848.

Amazon Web Services, Migrating AWS Resources to a New AWS Region, pp. 1-43, downloaded on Mar. 8, 2018 from: https://d0.awsstatic.com/whitepapers/aws-migrate-resources-to-new-region.pdf.

Geier, Moving EC2 Instances Across Availability Zones or AWS Regions, pp. 1-4, downloaded on Jan. 24, 2018 from: https://www.serverwatch.com/server-tutorials/moving-ec2-instances-across-availability-zones-or-aws-regions.html.

Google, Moving an Instance Between Zones, pp. 1-5, downloaded Jan. 19, 2018 from: https://cloud.google.com/compute/docs/instances/moving-instance-across-zones.

Google, Live Migration, pp. 1-4, downloaded Jan. 19, 2018 from: https://cloud.google.com/compute/docs/instances/live-migration.

VMware, Inc., VMware VMotion, Live Migration of Virtual Machines Without Service Interruption, pp. 1-2, downloaded on Jan. 19, 2018 from: https://www.vmware.com/pdf/vmotion_datasheet.pdf.

KVM, Migration, pp. 1-4, downloaded Jan. 19, 2018 from: https://www.linux-kvm.org/page/Migration.

Alibaba Cloud, ApsaraDB for RDS, User Guide, pp. 1-79, downloaded Jan. 19, 2018 from: https://www.alibabacloud.com/help/doc-detail/26181.htm.

Scott Scovell, Migrating Azure Virtual Machines to Another Region / Kloud Blog, pp. 1-3, downloaded Jan. 19, 2018 from: https://blog.kloud.com.au/2014/11/16/migrating-azure-virtual-machines-to-another-region/.

Flanegin, Oracle Access Manager—Upgrade Guide, Oct. 2007, pp. 1-654, downloaded on Mar. 9, 2018 from: https://docs.oracle.com/cd/E12530_01/oam.1014/b32416/zdt_ovr.htm.

* cited by examiner

COMPUTERIZED METHODS AND SYSTEMS FOR MIGRATING CLOUD COMPUTER SERVICES

CROSS REFERENCE TO RELATED APPLICATIONS

This disclosure claims the benefit of U.S. Provisional Patent Application Ser. No. 62/690,528 filed Jun. 27, 2018, titled "Computerized Methods and Systems for Migrating Cloud Computer Services", which is incorporated by reference herein in its entirety.

BACKGROUND

Cloud computing is an information technology (IT) paradigm that enables ubiquitous access to shared pools of configurable system resources and higher-level services that can be rapidly provisioned with minimal management effort, often over the Internet. Third-party clouds enable organizations to focus on their core businesses instead of expending resources on computer infrastructure and maintenance. Cloud providers typically use a "pay-as-you-go" model, a subscription model, or a variety of other models. A cloud computing environment (aka "cloud environment") is a collection of physical and virtual infrastructure hardware and software used for cloud computing. The cloud computing environment can be used to provide services (known as "cloud services").

The combination of Virtual Machines (VMs), network connectivity among them, their operating systems, and middleware and application software stacks on each VM comprise a service instance. In Oracle cloud services, for example, each service includes a routing tier, a middle tier, and possibly a data tier. Usually, the routing and data tiers are shared among multiple middle tier service instances (hereinafter, instances). Instances are standardized and comprised of a collection (particular to each service) of VM shapes (specifications of CPU, memory, storage).

Cloud services are provisioned on demand. When a customer orders a service, an order processing system receives the type of service being ordered and submits the request to a service provisioning system, which initiates service provisioning. Service provisioning involves creation, configuration, and startup of the instance. This is a lengthy process that typically takes minutes, but sometimes, under high-demand, can take hours.

The cloud computing environment hosts various services (cloud services) that can be accessed remotely (by remote devices, programs, or people) over a network. As used herein, a remote device accessing the cloud computing environment may correspond to a program executing code, a user, etc. utilizing a remote device (hardware or software) to access the cloud computing environment over a network. Some cloud services are shared—where all users access the same instance of a service. Other cloud services require existence of a service instance per user or group of users. The latter, in order to be used by a particular party, need to be provisioned. In prior systems, all cloud services require existence of a service instance per user or group of users. In some cases this group of users includes all users. Regardless of the mapping of instances to users, provisioning is always required. Even if all users share the only existing instance, someone had to provision that instance and, likely, provide user access to it.

A user will subscribe to the cloud computing environment by providing identifying information and an intent to utilize one or more services in the future. Once the subscriber is defined, the subscriber can request access to a service instance. When a request for access to the service is received from a remote device, an instance of the service is created on-demand and executed. On-demand creation and execution of the instance is triggered when the cloud computing environment receives the request for access to the service. A service instance (hereinafter "instance") is a collection of one or more computing resource(s) interrelated in a way defined by the particular service and comprising an orderable and provisionable unit of the service. The instance can be hosted within a virtual machine that executes software of the service using processor, memory, and storage resources of the cloud computing environment. The instance can be comprised of a collection of virtual machines of diverse shapes.

On-demand creation of an instance of a service is time consuming and consumes a large amount of computing resources. The time to create the instance can take minutes or even hours when the cloud computing environment is under high demand. This introduces significant delays in availability of the service to the requestor because the requestor cannot access the service until the instance is fully created and executing. Further, there may not be adequate computing resources available or reserved for the creation of the instance when the request is received, and thus the creation of the instance is further delayed.

When an instance is created, the instance is created within a particular zone of the cloud computing environment. A zone comprises a pool of available resources such as processor, memory, storage, network, and/or other computing resources that can be used by executing instances. The zone can be defined as a logical or physical entity for hosting instances of services utilizing virtual machines and the computing resources of the zone. In this way, the zone is an elastic operational environment that is able to adapt to service workload changes by provisioning and de-provisioning computing resources in an autonomous manner. The cloud computing environment, including one or more data centers, can comprise a plurality of zones.

In prior systems, when an instance is created and assigned to a particular zone, the instance cannot be moved from that zone to another zone. That is, the cloud computing environment is unable to dynamically reconfigure resource assignment for execution of instances. This significantly limits the ability to efficiently operate a cloud computing environment. This is because the cloud computing environment is unable to efficiently manage resource utilization (workload distribution across zones) or recover from resource failures within a zone. In particular, sub-optimal placement of instances can occur because instances may not be initially created within an optimal zone that provides lower client latency and improved efficiency for service execution and access. This can occur because the instances are placed within a sub-optimal zone due to that zone having available resources at that time. However, another zone or data center closer to a client computer accessing the instances may provide lower latency for the client computer. Unfortunately, the instances cannot be moved to the more optimal zone or data center that would provide lower latency and improved service execution efficiency and resource utilization. Further, if there is a failure of computing resources of the zone, then instances of that zone are unable to be moved to another zone for efficient failover recovery. This can result is significant downtime for client computers, which can affect operation of such client computers that are waiting on access to such instances.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
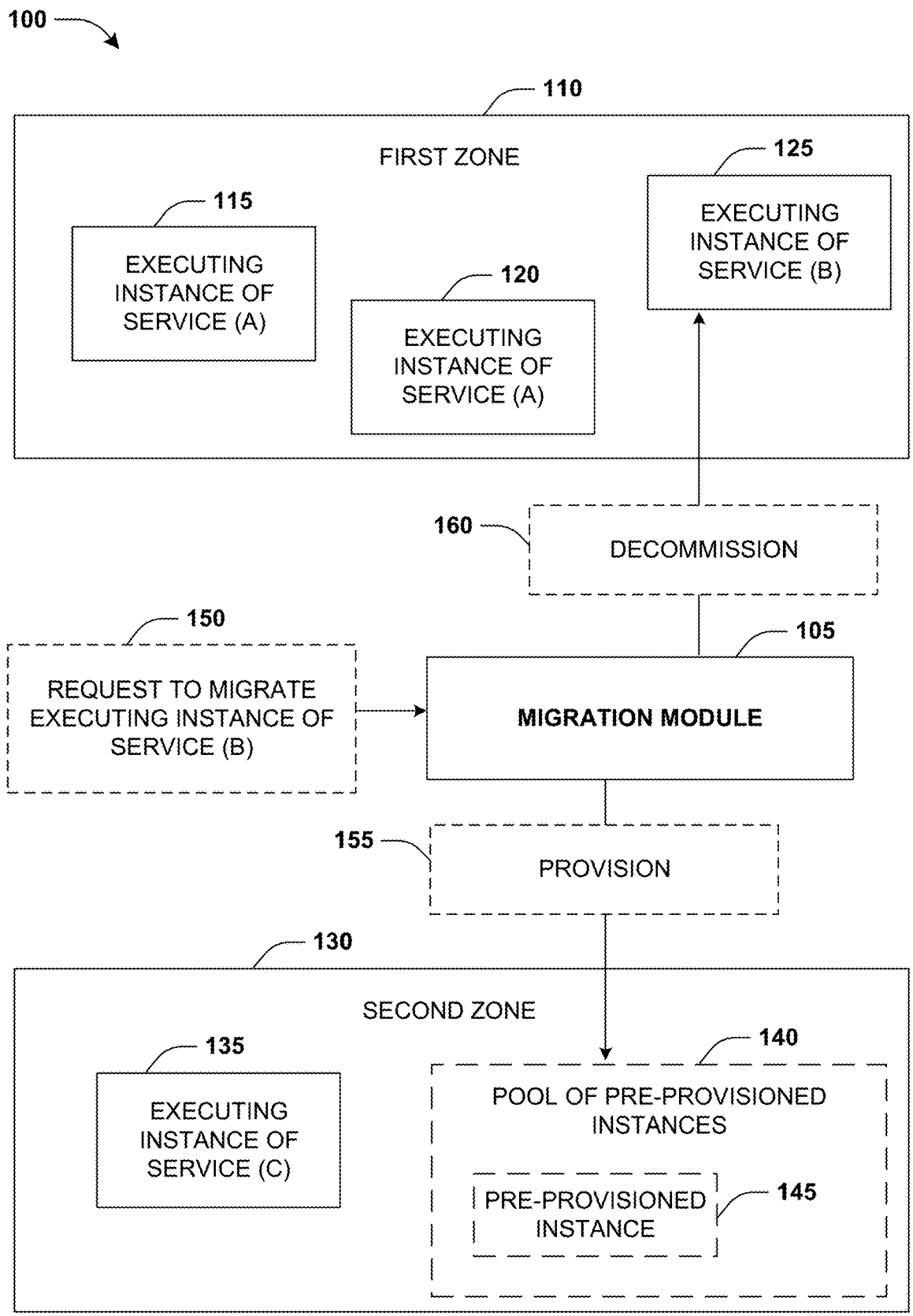
FIG. 1 illustrates an embodiment of a system associated with migrating an instance of a service.

Computerized systems and methods are described herein that provide for migrating (relocating) an instance of a computer-implemented and performed service between zones, between data centers, or within a zone. A cloud computing environment or other computing system is capable of executing instances of services requested by remote computing devices. A service comprises an application stack. The application stack comprises one or more application programs having executable code that is executed using computing resources of the cloud computing environment. For example, the application stack is a suite or group of application programs that are executed to work together to achieve a common goal. The cloud computing environment may host a variety of services. For example, the service may comprise a calendar service, an email service, a financial analysis service, or any other type of applications that can be executed by the cloud computing environment.

As used herein, a "pre-provisioned instance" includes a configured collection of Virtual Machines (VMs) and service-supporting dependencies including computer resources. This is an initial resource configuration but has no specific application software loaded. The pre-provisioned instance is proactively constructed in advance of an anticipated demand for a service so the system can more quickly setup and provide the service when needed. The pre-provisioned instance does not include application software (executable code) of a service and is not yet assigned to a customer in production.

A "provisioned instance" is a pre-provisioned instance that includes the application software for a requested service (application is installed in the instance). Being "provisioned" means that the provisioned instance is also uniquely assigned by the system to a customer and is executing in a production setting (and the provisioned instance is also referred to as a production instance).

A "pointer" as used in one or more embodiments is a means of identifying and/or locating an instance. Pointers and/or tags are used to assign or add (hereinafter referred to as 'assignment') an instance to a selected pool of instances. Pointers are stored and maintained in a data structure stored in a memory. A service instance is typically identified and referred to by a pointer or tag in one of several ways. For example, (1) by an IP address of one of the elements of the instance (such as a front-end load balancer, but possibly one VM of the instance); (2) by a URL or URI of the instance (for example, pointing at the front-end load balancer, but may be directly at VM's Web destination or Web service end point, such as REST or SOAP); (3) by symbolic name translatable via DNS (domain name server) into an IP address (thus reduced to 1); (4) by symbolic name (or tag) translatable by an inventory system into the one of the examples 1-3 above; or (5) by variations of the previous examples. In another embodiment, even though an instance does not have to contain a pointer, the pointer contains the identification of that instance. Thus, if the instance is known, its pointer can be found in one of the pools by searching for the identification within the pointers. If the pointer is not found in a pool, then the instance has not been assigned to that pool.

In another embodiment where instances have multiple virtual machines (multi-VM instances), if it is desired to know all the elements comprising an instance, an inventory system would be consulted, or a self-description method could exist, similar to the above pointers, which would return an enumeration of all entities comprising an instance.

A "pool" of instances, in one embodiment, is defined by a collection of instance pointers that identifies the instances that belong to the pool. For example, a data structure is created to maintain the collection of instance pointers for each pool. When an instance is assigned to a pool, its pointer is added to the corresponding collection of pointers for that pool (e.g., a pool pointer list). When an instance is removed from a pool, its pointer is removed from the corresponding collection of pointers. Moving an instance from pool 1 to pool 2 is a combination of removing the pointer from pool 1 and adding the pointer to the collection of pointers for pool 2.

In one embodiment, instances are assigned to pools and located by pointers and/or tags that identify an assignment relationship between an instance and a pool. A pool of instances is defined by a collection of pointers that belong to that pool. Assigning an instance to a pool involves adding a pointer of the instance to the collection of pointers of the pool. Moving an instance from one pool to another pool involves removing the pointer from a current pool and reassigning (by adding) the pointer of the instance to a different pointer collection associated with the other pool. In one embodiment, a list or collection of pointers is maintained for each pool that identifies the instances that belong to that pool.

An instance of a service is provisioned by configuring one or more VM shapes (e.g., specifications of CPU, CPU cycles, a number of processors, memory resources, storage resources, and networking resources) to a computing environment based on the type of service requested. The computing environment (e.g., a virtual machine) is configured to execute the executable code of the service through the provisioned instance. That is, a provisioning system determines an appropriate VM shape and uses resources to create one or more virtual machines to execute a service instance being provisioned. In one embodiment, resources include instances of other services. For example, a service requires a network load balancer and a database. The service will make use of a Load Balancer as a Service (LBaaS) and a DataBase as a Service (DBaaS) as ready, separately provisionable, service instances. The provisioning system may be called (e.g., recursively) to provision lower level services for use by the new service instance being provisioned. In this way, a remote device can access functionality of the service through the executing provisioned instance hosted by the cloud computing environment.

Zones are defined within the cloud computing environment for hosting instances. A zone comprises a pool of available resources such as processor, memory, storage, network, and/or other computing resources that can be used by instances assigned to that zone for execution. The zone is an elastic operational environment that is able to adapt to service workload changes by provisioning and de-provisioning computing resources used by instances in an autonomous manner. The zone can be defined as a logical or physical entity for hosting instances of services utilizing virtual machines and the computing resources of the zone. The cloud computing environment, including one or more data centers, can comprise a plurality of zones.

As provided herein, operation of the cloud computing environment is improved by facilitating the migration of instances between zones residing in one or more data centers, and/or within a zone. This technical improvement to existing technical processes is achieved by proactively constructing pre-provisioned instances of a service. A pre-provisioned instance comprises a computing environment of computing resources of a zone and an application stack of the service. The application stack comprises executable code of an application or suite of applications of the service. In one embodiment, the pre-provisioned instance is maintained in a non-executing state such that the executable code of the application stack is not executed until subsequent provisioning. In one embodiment, any number of pre-provisioned instances of the service can be proactively created. In another embodiment, the number of pre-provisioned instances is limited to the size of the pre-provisioned pool.

In response to receiving a request to migrate an executing instance of a service, the pre-provisioned instance is provisioned by executing the executable code using the computing environment of computing resources of the zone. Because the pre-provisioned instance already comprises the computing environment of computing resources and the application stack, the pre-provisioned instance can be quickly and efficiently provisioned as a migrated instance of the executing instance. The executing instance can be decommissioned, and subsequent access requests for the service are routed to the migrated instance.

In one embodiment, the migration is between two different zones. Migrating the instance between zones provides the ability to dynamically reconfigure zone resources. This allows for workload management across multiple zones for improved resource utilization across those zones. This also improves the operation of computers within the cloud computing environment. Such improvement is achieved because instances executing within a high utilization zone can be migrated to a low utilization zone to reduce resource strain and increased response time of the high utilization zone.

In one embodiment, the migration is performed within the same zone, where the decommissioned instance and the migrated instance are in the same zone. Same zone migration using pre-provisioned instances for fast provisioning allows for quick failover recovery and high availability within the same zone. If an executing instance within a zone experiences a failure, then migration can be performed to provision a migrated instance of the failed instance within the same zone.

In another embodiment, the migration is performed between zones in different data centers. Migrating instances between data centers allows for optimization of topology and/or proximity. For example, instances can be migrated to a data center that is closer to a client device accessing the instance. This can reduce latency for the client device. In another embodiment, instances may be migrated to collocate integrated multiple instances of diverse services. For example, a user may purchase service (A) with an instance in zone (1). Later, the customer buys service (B) with an instance in zone (2). Instances of service (A) and (B) could be integrated, such as where service (A) creates data consumed by service (B). Thus, it would be advantageous to collocate instances of service (A) and (B) in the same zone in order to minimize data transfer delay between the instances of the service (A) and the service (B).

With reference to FIG. 1, one embodiment of a system 100 associated with migrating instances of services is illustrated and summarized. A more detailed description is provided with reference to FIG. 2. The system 100 is implemented as a migration module 105 hosted on a computing device. In one embodiment, the migration module 105 is associated with a cloud computing environment that hosts services made accessible to remote devices (e.g., an application, a user, a computer executing code, etc.). Such services can correspond to application hosting services, Software as a Service (SaaS), network storage, and a wide variety of other software applications and computer implemented services. Such instances of services are executed using computing resources of the cloud computing environment.

Zones of computing resources of the cloud computing environment can be defined as a logical or physical entity for hosting instances of services utilizing virtual machines and computing resources of each zone. A first zone 110 is defined to comprise a first available resource pool of processor, memory, storage, network, and/or other computing resources. A second zone 130 is defined to comprise a second available resource pool of computing resources separate from the computing resources assigned to the first zone 110. In this way, executing instances of services can be executed within the first zone 110 using the first available resource pool. Other executing instances of services can be separately executed within the second zone 130 using the second available resource pool. The zones may be in the same or different data centers.

In one embodiment, a first executing instance 115 of a service (A) and a second executing instance 120 of the service (A) are executing within the first zone 110 using the available resources of the first zone 110. An executing instance 125 of a service (B) is executing within the first zone 110 using the available resources of the first zone 110. An executing instance 135 of a service (C) is executing within the second zone 130 using available resources of the second zone 130.

The migration module 105 maintains a pool 140 of pre-provisioned instances within the second zone 130. The pool 140 is defined by a collection of instance pointers that identify the instances that are assigned to the pool 140. For example, the migration module 105 constructs a pre-provisioned instance 145 of the service (B) within the pool 140 and adds a corresponding instance pointer of instance 145 to the collection of instance pointers (a pointer list) for the pool 140. The pre-provisioned instance 145 comprises a collection of computing resources of the second zone 130 as a computing environment that can be used to execute executable code of the service (B). The computing environment may comprise processor, memory, storage, network resources, a virtual machine, and/or other computing resources used to execute the executable code. The executable code, such as an application stack of one or more applications of the service (B), is installed into the pre-provisioned instance 145. In this way, the pre-provisioned instance 145 comprises the computing environment and the executable code of the service (B) that can be subsequently executed by the computing environment. The pre-provisioned instance 145 is maintained in a non-executing state until subsequent provisioning.

Constructing the computing environment and installing the executable code can take a significant amount of time and thus is proactively done ahead of time before there is a request for migration. In this way, subsequent provisioning of the pre-provisioned instance 145 can be quickly and efficiently performed so that the pre-provisioned instance 145 can be provisioned as a migrated instance for migration. This is due to the assignment of computing resources and the installation of the executable code being already proactively completed.

In one embodiment of pre-provisioning, the migration module 105 determines what computing resources will be used by the service (B). The migration module 105 also determines what executable code and version is currently used by the service (B). The migration module 105 evaluates available resources of the second zone 130 to determine whether the second zone 130 has available computing resources that are used by the service (B) to execute the executable code. If there are available computing resources, then the migration module 105 assigns the computing resources that will be used by the service (B) into the pre-provisioned instance 145. The migration module 105 installs the executable code, such as the latest version used by the service (B), into the pre-provisioned instance 145 in a non-executing state. In one embodiment, the pre-provisioned instance 145 is a virtual machine or other environment capable of executing the executable code using the assigned computing resources.

The migration module 105 receives a request 150 to migrate the executing instance 125 of the service (B) from the first zone 110 to the second zone 130. The request 150 may be received in response to a determination that resource utilization within the first zone 110 is significantly higher than the second zone 130. Thus, dynamic reallocation of instances between zones would improve operation of the first zone 110 and better utilize available resources of the second zone 130. In another example, the request 150 may be received because resources used by the executing instance 125 have failed or have degraded performance. Thus, a failover operation is needed because operation of the executing instance 125 is affected by the failure or degraded performance.

Accordingly, the migration module 105 reconstructs the executing instance 125 of the service (B) in the second zone 130 using the pre-provisioned instance 145. In particular, the migration module 105 determines identifying information about the executing instance 125. The identifying information may comprise information about what computing resources of the first zone 110 are used by the executing instance 125 to execute and what executable code and version is executed by the executing instance 125. The identifying information may indicate that the executing instance 125 is executing an application stack of the service (B). The migration module 105 utilizes the identifying information to select an appropriate pre-provisioned instance from the pool 140. For example, the pre-provisioned instance 145 comprises a computing environment and executable code of an application stack of the service (B).

In order to reconstruct the executing instance 125 in the second zone 130, the migration component 105 provisions 155 the pre-provisioned instance 145 from the pool 140 of the second zone 130. Because the computing environment and the executable code of the application stack were proactively pre-provisioned to the pre-provisioned instance 145, provisioning the pre-provisioned instance 145 takes little to no time to perform. For example, pre-provisioning can take minutes to hours depending on a current load of the cloud computing environment, whereas provisioning can take seconds. The pre-provisioned instance 145 is provisioned as a migrated instance of the executing instance 125 by executing the executable code using the computing environment of the pre-provisioned instance 145. In one embodiment where the pre-provisioned instance 145 is a virtual machine, the virtual machine is instantiated such that an operating system of the virtual machine and the executable code is executed by the virtual machine.

Subsequent access requests for the service (B), such as for the executing instance 125 in the first zone 110, are routed to the migrated instance in the second zone 130. For example, a remote client device may be accessing the executing instance 125 that provides storage services to the remote client device. After provisioning, storage service requests from the client device are rerouted from the executing instance 125 in the first zone 110 to the migrated instance in the second zone 130. Once access requests are being routed to the migrated instance, the executing instance 125 may be debugged and/or decommissioned 160 to release its computing resources back to the first zone 110 for other uses.

In this way, the executing instance 125 can be quickly and efficiently migrated from the first zone 110 to the second zone 130, such as within seconds instead of minutes or hours. Existing technological processes for migration are improved because such technical processes could not migrate instances between zones. Furthermore, such technological processes are improved because the time to migrate is greatly reduced since the time consuming and resource intensive operations of constructing the computing environment and installing the executable code are proactively performed ahead of time during pre-provisioning.

Figure 2:
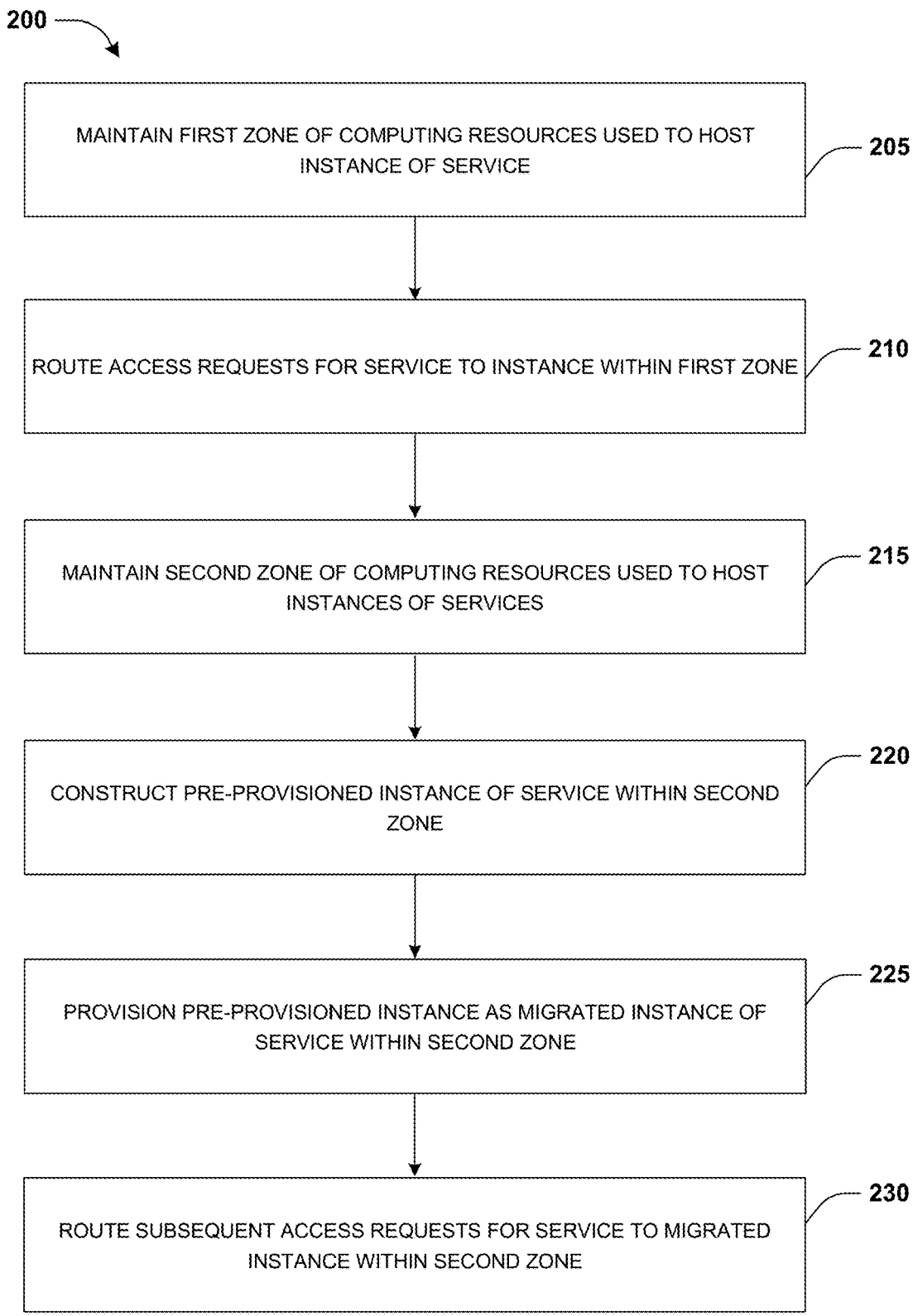
FIG. 2 illustrates an embodiment of a method associated with migrating an instance of a service.

With reference to FIG. 2, one embodiment of a computer implemented method 200 associated with migrating instances of services is illustrated. In one embodiment, the method 200 is performed by the migration module 105 and system 300 of FIGS. 3A-3D utilizing various computing resources of the computer 615 of FIG. 6 or other computers. The computing resources, such as the processor 620, are used for executing instructions associated with constructing pre-provisioned instances of services and migrating executing instances of the services by provisioning the pre-provisioned instances as migrated instances of the services. Memory 635 and/or disks 655 are used for storing pre-provisioned instances and/or other data. Network hardware is used for providing remote devices with access to executing instances of the services over a network. The method 200 is triggered upon a command to host a service such as through a cloud computing environment.

The cloud computing environment comprises computing resources, such as servers, networking equipment, and storage used to host services. The services are made accessible by the cloud computing environment to remote devices over a network. Such services can correspond to a wide variety of services, such as storage services, application hosting services, network analysis, etc. For each remote device requesting access to the service, an instance of the service is provisioned and executed. An instance is executed using computing resources of the cloud computing environment provisioned for the instance. In one embodiment, an instance is hosted within a virtual machine that has access to the provisioned computing resources, such as processor, memory, storage, and networking resources.

Figure 3A:
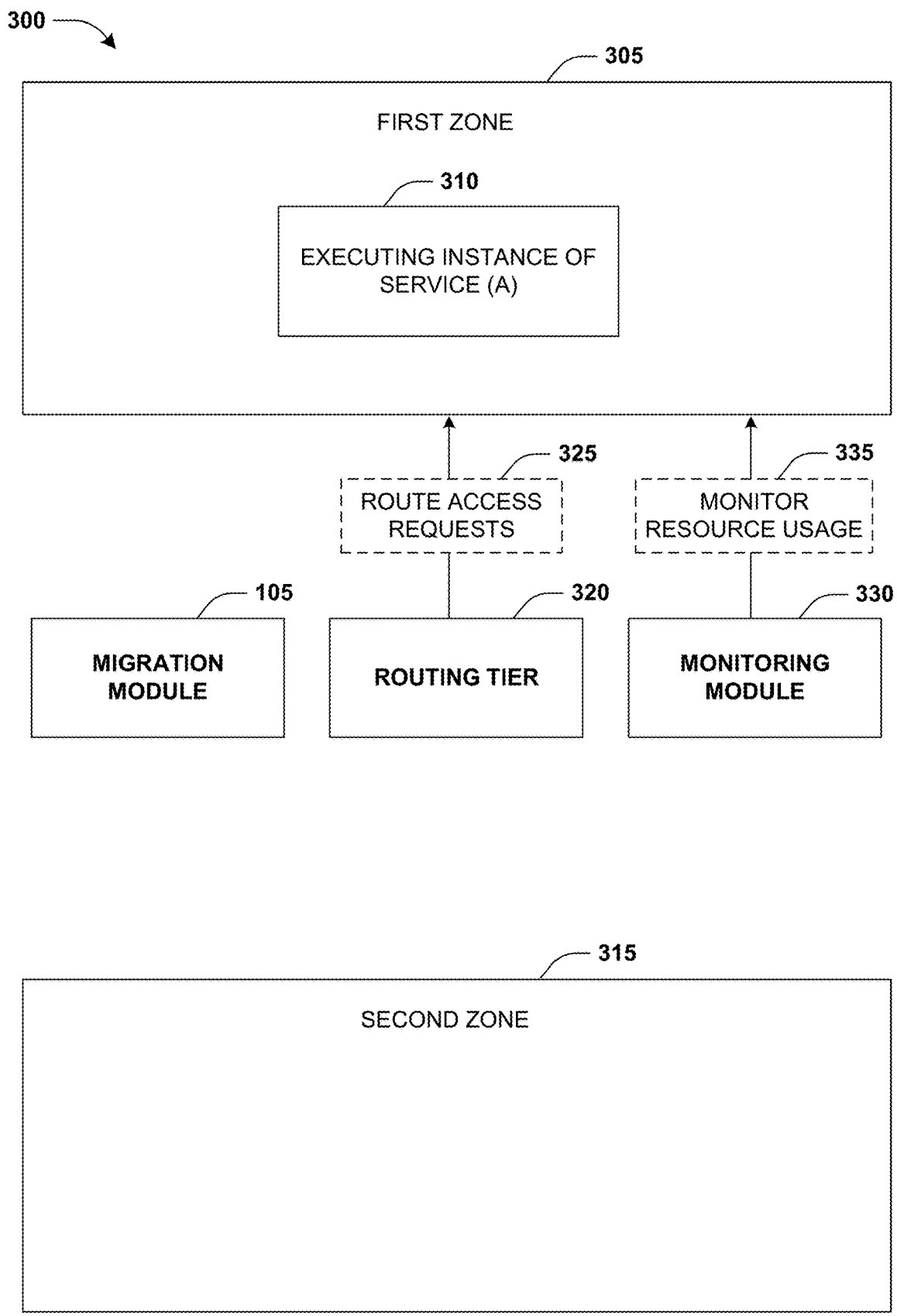
FIG. 3A illustrates an embodiment of a system associated with migrating an instance of a service, where the instance is executing within a first zone.

Zones may be defined within the cloud computing environment, such as a first zone 305, a second zone 315 and/or other zones, as illustrated by FIG. 3A. A zone is an operational environment of computing resources that can be used to host instances of services. The zone may be defined as a logical or physical entity for hosting instances of services utilizing virtual machines and the computing resources of the zone. In this way, services are assigned to particular zones so that instances of those services can be executed using computing resources of those zones.

Available resource pools are assigned to each zone of the cloud computing environment. An available resource pool of a zone comprises processor, memory, storage, and network resources (e.g., IP addresses) that can be used by executing instances of services. For example, a virtual machine, executing an instance of an analytics application, can utilize the available resources for executing the analytics application. In this way, provisioned instances of services can be executed through virtual machines utilizing available resources from an available resource pool of a zone. In one embodiment, an executing instance 310 of the service (A) may be executed within the first zone 305 using available resources of the first zone 305.

The cloud computing environment comprises a routing tier 320. The routing tier 320 comprises network routing hardware and functionality. The routing tier 320 is configured to direct requests from remote devices for a service to appropriate instances of the service. Similarly, the routing tier 320 transmits back information and data from an executing instance to a remote device. In this way, data is transferred by the routing tier 320 between remote devices and instances hosted by the cloud computing environment. The routing tier 320 can be used to transmit data between instances, such as where an instance of one service processes data from an instance of another service.

In one embodiment, one or more remote client computers accessing the service (A) are routed by the routing tier 320 to the executing instance 310 and/or other executing instances of the service (A). The executing instance 310 of the service (A) is executed for a remote client computer within the first zone 305. Thus, access requests from the remote client computer are routed to the executing instance 310 within the first zone 305. In one embodiment, the routing tier is shared among multiple instances of a service. In another embodiment, the routing tier is shared among multiple instances of multiple services. In yet another embodiment, the routing tier is dedicated to a service instance.

The cloud computing environment comprises a data tier. The data tier comprises a plurality of storage devices, databases, and data access functionality. Client data of clients that utilize the services of the cloud computing environment is stored within the data tier. In this way, when a remote client computer invokes an instance of a service to execute, the instance will process client data that is stored within the data tier for that remote client computer. For example, a user of the remote client computer may log into the cloud computing environment through a user account. The user account may have access rights to certain storage within the data tier. Thus, client data of the user is stored within such storage.

The cloud computing environment comprises a monitoring module 330. The monitoring module 330 is configured to monitor 335 resource usage by executing instances. The monitoring module 330 monitors resources consumed by executing instances. The monitor module 330 also monitors demand from remote devices for each service and latency experienced by the remote devices. The monitoring module 330 also monitors remaining available resources of a zone, percent utilization of resources, resource utilization trends, etc. In one embodiment, the monitoring module 330 may determine that one or more instances of a zone are to be migrated based upon monitored resource utilization, as will be described later in further detail.

At 205, the first zone 305 of computing resources is maintained, such as for hosting the executing instance 310 of the service (A) and/or other executing instances of the service (A) or other services. The executing instance 310 of the service (A) executes executable code of an application stack of the service (A) using the computing resources of the first zone 305. In one embodiment, a remote client computer requests access of the service (A) in order to perform analytics on financial data stored within the data tier. In response to the request, an instance of the service (A) is executed as the executing instance 310. The executing instance 310 executes the executable code of the application stack, such as analytical processing code of an analytics application. The routing tier 320 routes access requests 325 between the remote client computer and the executing instance 310 within the first zone 305 over a network. In this way, access requests for the service (A) from the remote client computer are routed (block 325) to the executing instance 310 within the first zone 305, at 210.

At 215, the second zone 315 of computing resources is maintained for hosting instances of services. The second zone 315 may be defined as a logical or physical entity that is separate from (i.e., isolated from) the first zone 305. For example, the computing resources of the second zone 315 are not shared with computing resources of the first zone 305. The second zone 315 may be comprised of servers, storage devices, virtual machine, network devices, IP addresses, and/or other resources that are not shared by the first zone 305. In one embodiment, the first zone 305 and the second zone 315 may be in the same data center. Executing instances of services within the two zones may communicate with one another over an internal network of the data center using the routing tier 320. In another embodiment, the first zone 305 and the second zone 315 are located in different data centers. Executing instances of services within each of the zones may communicate over an external network between the data centers using the routing tier 320 of the data center hosting the first zone 305 and a routing tier of the other data center hosting the second zone 315.

Figure 3B:
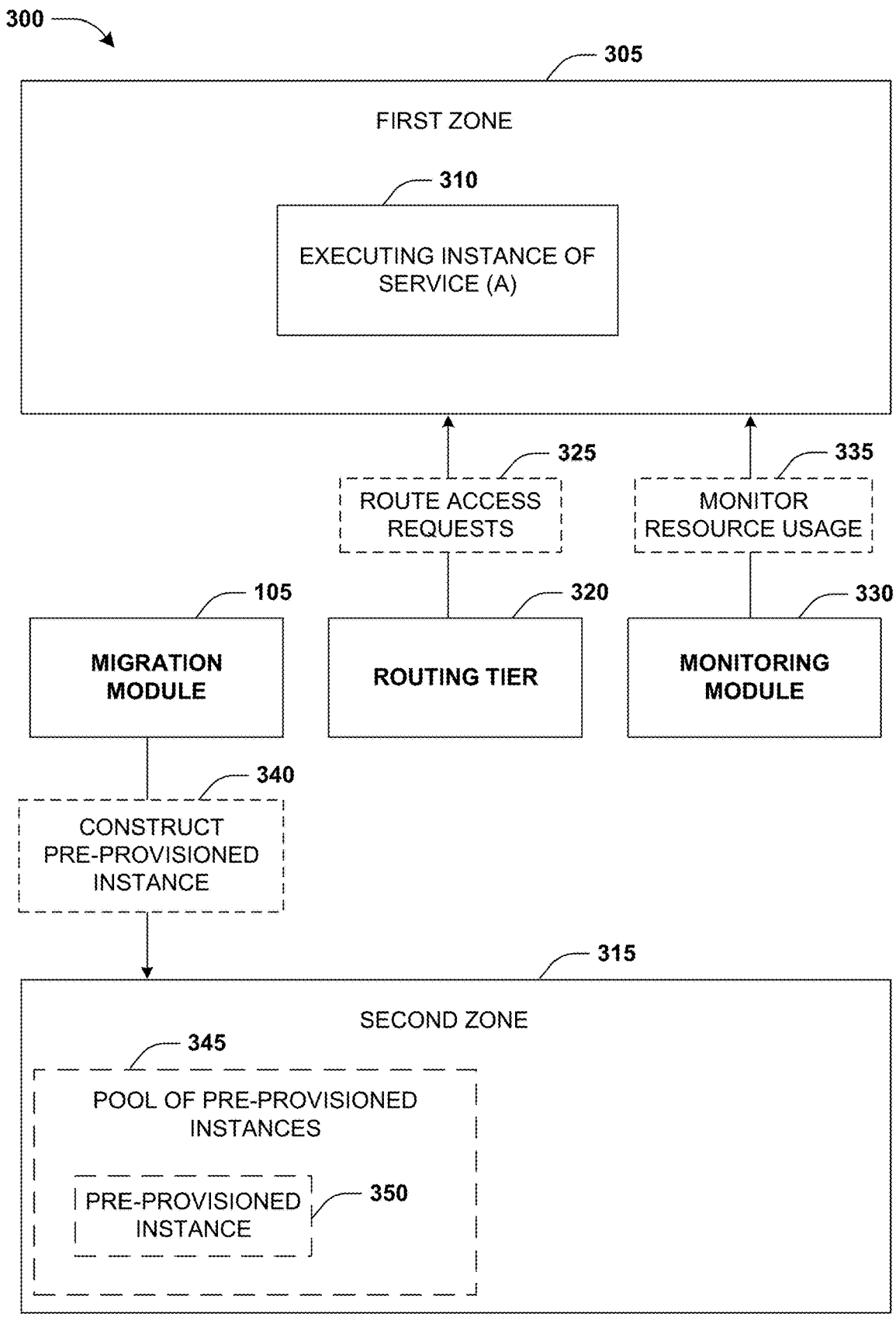
FIG. 3B illustrates an embodiment of a system associated with migrating an instance of a service, where a pre-provisioned instance is created within a second zone.

At 220, a pre-provisioned instance 350 of the service (A) is constructed 340 within the second zone 315, as illustrated by FIG. 3B. In particular, a pool 345 of pre-provisioned instances is maintained for constructing pre-provisioned instances therein from available resources of the second zone 315. The available resources are assigned to the pre-provisioned instance 350 based upon what computing resources are required by an instance of the service (A). Such computing resources may be specified ahead of time by the service (A) or through a service level agreement of clients. For example, some users may subscribe to certain levels of services, such as more data redundancy, lower latency, deduplication for improved storage, additional software features, etc. Thus, pre-provisioned instances may be pre-provisioned with various levels of computing resources and software.

In other embodiments, the computing resources may be pre-defined (e.g., via a template) or programmatically determined based upon historic execution of instances of the service (A). For example, the instance comprises a virtual machine that will execute the executable code of the application stack of the service (A). An operating system of the virtual machine, the executable code of the application stack, and other applications or functionality executed by the virtual machine will consume processor, memory, storage, and network resources. Accordingly, an amount of available computing resources is assigned to the pre-provisioned instance 350 of the service (A) so that the pre-provisioned instance 350 can operate and provide the level of service subscribed to by clients. Any number of pre-provisioned instances can be created within the second zone 315.

In one embodiment, the executable code of the application stack of the service (A) may be upgraded. Accordingly, the migration module 105 may identify a software upgrade for the service (A), such as by receiving a notification of the software upgrade from a remote device of a provider of the service (A). The migration module 105 may retrieve the software upgrade, such as from the remote device of the provider of the service (A). The migration module 105 implements the software upgrade upon the executable code within the pre-provisioned instance 350. In this way, pre-provisioned instances of services can be maintained with up-to-date versions of executable code of application stacks of such services.

Figure 3C:
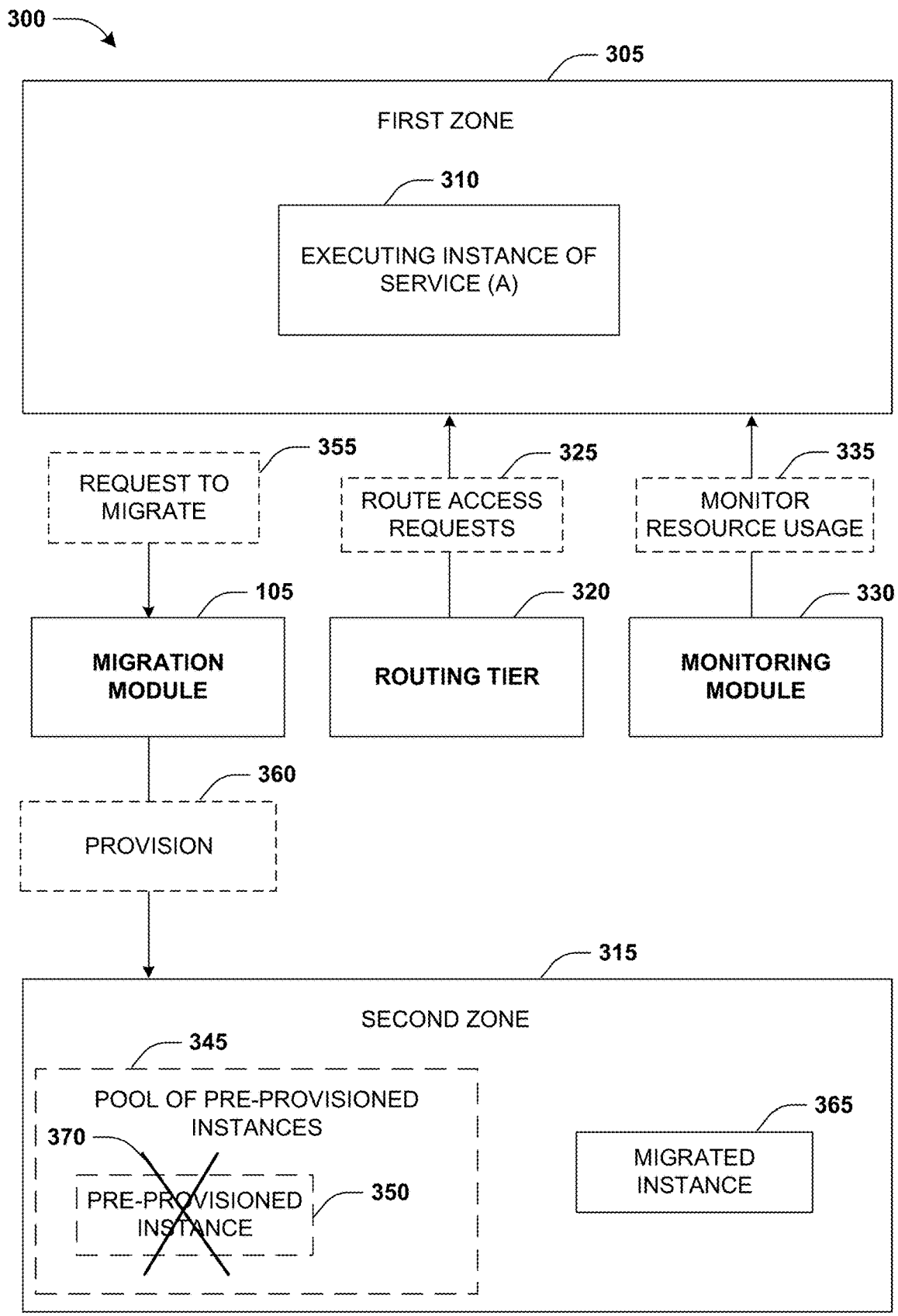
FIG. 3C illustrates an embodiment of a system associated with migrating an instance of a service, where a pre-provisioned instance is provisioned as a migrated instance.

Once the pre-provisioned instance 350 has been created, the pre-provisioned instance 350 can be subsequently provisioned as a migrated instance 365. In one embodiment, a request 355 to migrate the executing instance 310 in the first zone 305 is received, as illustrated by FIG. 3C. In one example, the request 355 may be received based upon the monitoring module 330 performing monitoring of resource utilization. The resource utilization monitoring may indicate that resource utilization of the first zone 305 is high and resource utilization of the second zone 315 is low. Thus, the request 355 may indicate that the executing instance 310 should be migrated to the second zone 315. In another example, the monitoring module 330 may evaluate topology and proximity of a data center hosting the first zone 305 and a data center hosting the second zone 315 in relation to a remote client computer accessing the executing instance 310. The monitoring module 330 may determine, based upon the topology and proximity, that latency would be reduced for the remote client computer if the executing instance 310 was migrated to the second zone 315. In this way, the migration module 105 determines that the executing instance 310 should be migrated from the first zone 305 to the second zone 315. Accordingly, the migration module 105 will reconstruct the executing instance 310 within the second zone 315 in response to the request 355.

As a part of reconstructing the executing instance 310, the pre-provisioned instance 350 is provisioned 360 as the migrated instance 365 of the executing instance 310, at 225. The pre-provisioned instance 350 is provisioned 360, and thus can execute the executable code of the application stack. The executable code is executed using the computing resources of the second zone 315 that were assigned to the pre-provisioned instance 350. The provisioning 360 can be performed quickly and efficiently (such as within seconds) because the computing resources were already assigned to the pre-provisioned instance 350 and the executable code was already installed into the pre-provisioned instance 350. In this way, the migrated instance 365 executes the executable code of the application stack using the computing resources of the second zone 315. Thus, the migrated instance 365 can provide the same functionality of the service (A) to the remote client computer as the executing instance 310 of the service (A). As a result of provisioning the pre-provisioned instance 350, the pre-provisioned instance 350 is removed 370 from the pool 345 by removing the corresponding instance pointer of the instance 350 from the collection of instance pointers of the pool 345.

Figure 3D:
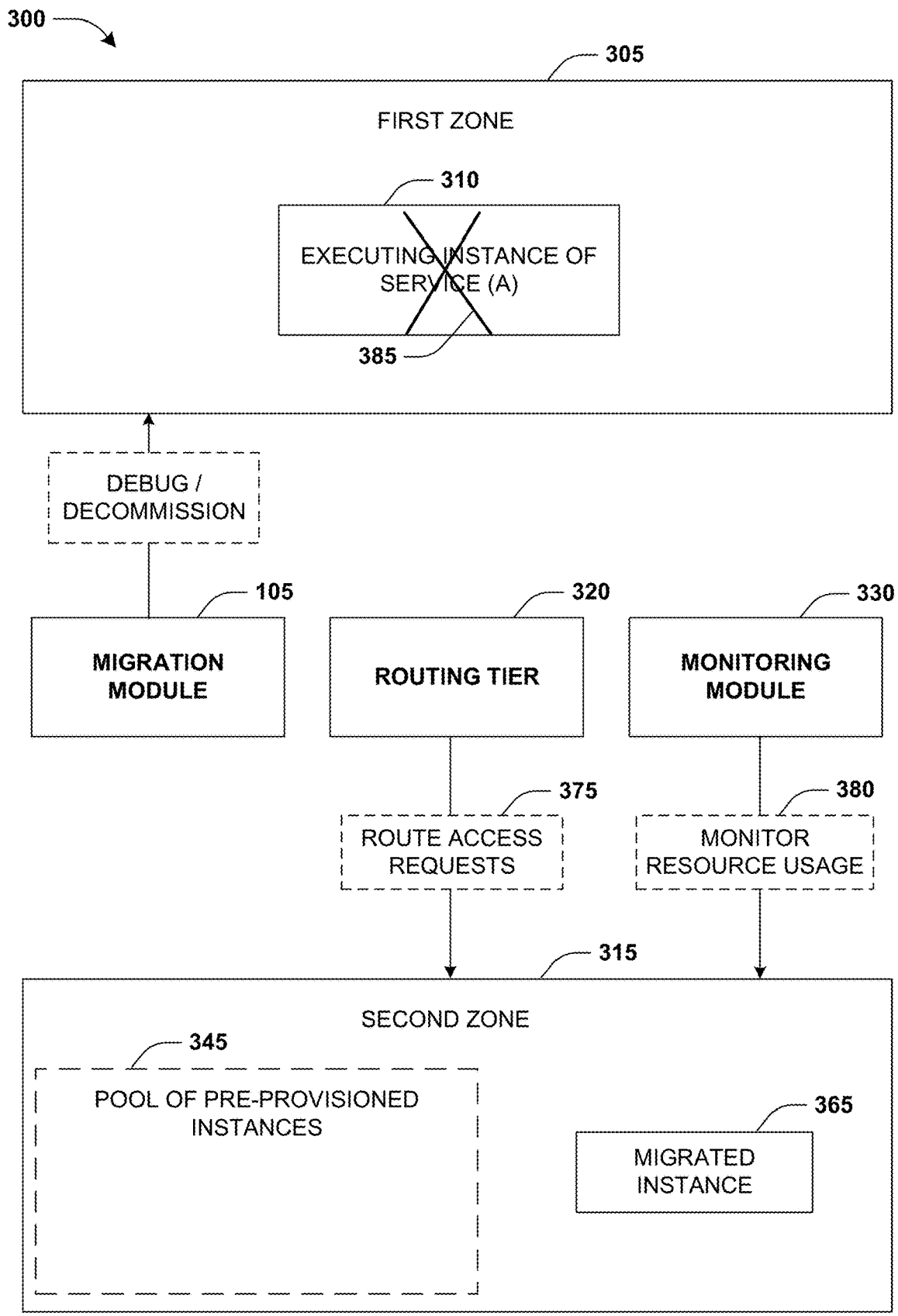
FIG. 3D illustrates an embodiment of a system associated with migrating an instance of a service, where access requests are routed to a migrated instance.

Once the migrated instance 365 is in an operational state, subsequent access requests for the service (A) that were directed to the executing instance 310 are re-routed 375, at 230. The subsequent access requests are re-routed 375 to the migrated instance 365 within the second zone 315, as illustrated by FIG. 3D. In one embodiment of switching over to the migrated instance 365, pending access requests being processed by the executing instance 310 at the first zone 305 are drained. The pending access requests are drained by allowing the executing instance 310 to finish processing the pending access requests. Once the drain starts, subsequently received access requests are either queued for later execution by the migrated instance 365 or are routed to the migrated instance 365 for execution. Once the pending access requests are drained, access by the executing instance 310 to client data, such as a database of client data hosted by the data tier, is turned off. A database connection string or other access information to the client data is inserted into the migrated instance 365 so that the migrated instance 365 can access and process the client data.

In one embodiment of switching over where the zones are in different data centers, the client data is migrated from a first data center comprising the first zone 305 to a second data center comprising the second zone 315. The client data may be migrated by performing a mirroring operation of the client data from the first data center to the second data center. Upon completion of the mirroring operation, the storage of the client data by the first data center may be decommissioned, e.g. deleted. The database connection string of the migrated instance 365 may be updated to point to the migrated client data within the second data center.

In one embodiment of routing 375 the subsequent access requests, the routing tier 320 is updated to point to the migrated instance 365 within the second zone 315. The routing tier 320 is updated for routing 375 the subsequent access requests to the migrated instance 365 that would previously have been routed to the executing instance 310 within the first zone 305. Such access requests may correspond to communication with the remote client computer for which the executing instance 310 was initially provisioned. The routing tier 320 is updated to stop pointing to the executing instance 310 within the first zone 305. In this way, access requests are no longer routed to the executing instance 310 within the first zone 305, but are now routed to the migrated instance 365 in the second zone 315. In one embodiment where the zones are hosted in different data centers, a domain name system (DNS) translation of an instance endpoint of the service (A) is updated. The instance endpoint is updated to point to a load balancer of the second data center for routing the access requests to the migrated instance 365 within the second zone 315 in the second data center. The instance endpoint is what the remote client computer accesses within the cloud computing environment for obtaining access to the service (A). In another embodiment, the routing tier is dedicated to the service instance, and moves with it when the service instance is relocated to a different zone in the same or different data center; in this case, the routing tier is relocated as a part of service instance relocation, and only DNS translation update is required to complete relocation.

In one embodiment, routing tier migration is performed where the routing tier 320 is not running in a same zone as a middle tier hosting a service instance being migrated. In another embodiment, the routing tier 320 may be running in the same zone (infrastructure) as the middle tier. For example, there could be a combined routing tier/middle tier integrated instance, and thus the routing tier 320 would be moved as part of moving the integrated instance. That is, the migration of either the routing tier integrated instance or the middle tier integrated instance would (eventually) precipitate the move of the other integrated instance, for the purpose of efficiency.

In one embodiment, a service instance includes other service instances. For example, an instance (S) of service (X) includes a routing tier instance (R) and a logging service instance (L). A migration (move) may be initiated. The migration can be initiated by a move of routing tier instance (R), which would require a move of instance (S), which would also entail moving logging service instance (L). The migration can be initiated by a move of logging service instance (L), which would require a move of instance (S), which would also entail moving routing tier instance (R). The migration can be initiated by a move of instance (A), which would require the move of the routing tier instance (R) and the logging service instance (L).

Once the migrated instance 365 is operational for processing the subsequent access requests, a notification of the migration is provided to the monitoring module 330. The notification instructs the monitoring module 330 to stop/disable the monitoring 335 of resource usage by the executing instance 310 of the first zone 305 because the executing instance 310 is no longer processing access requests. The notification instructs the monitoring module 330 to start/enable the monitoring 380 of resource usage by the migrated instance 365. In this way, the monitoring module 330 can monitor trends of resource usage, perform predictive analysis of future resource consumption, and/or perform load balancing of computer resources and instance execution within and/or across zones.

In one embodiment, the migration module 105 determines whether the executing instance 310 is marked for debugging. If the executing instance 310 is marked for debugging, then a debugging process is performed upon the executing instance 310. Results of the debugging process may be stored within storage or may be transmitted over a network to a remote device such as that used by an administrator. Once debugging is complete, or if the executing instance was not marked for debugging, then the executing instance 310 is decommissioned 385. In one embodiment, the executing instance 310 is decommissioned 385 after expiration of a time period or in response to a request to decommission the executing instance 310. The executing instance 310 is decommissioned 385 by deallocating the computing resources of the first zone 305 from the executing instance 310. The executing instance 310 is disassociated from the client data. In this way, the executing instance 310 is effectively deleted/removed from storage and memory, and thus no longer exists within the first zone 305.

In one embodiment of performing the migration, the migration module 105 determines that the executing instance 310 is part of a set of instances of services that have a dependency upon one another. For example, the executing instance may process data outputted by a second executing instance of a service (B). This dependency can be detected by evaluating the executing code of the services and/or monitoring network communication by the routing tier 320 between the instances. Accordingly, the migration module 105 may migrate the set of instances from the first zone 305 to the second zone 315. Maintaining the set of dependent instances within the same zone may reduce latency of communication between the instances because the instances may utilize resources within the same zone, hardware, and/or data center.

Utilizing pre-provisioned instances for migration allows the executing instance 310 to be quickly and efficiently (i.e., within seconds instead of minutes or hours) migrated from the first zone 305 to the second zone 315 (e.g., migrated within seconds instead of minutes or hours. Existing technical processes for migration are improved because such technical processes could not migrate instances between zones. Furthermore, such technical processes are improved because the time to migrate is greatly reduced since the time-consuming and resource intensive operations of constructing the computing environment and installing the executable code are proactively performed ahead of time during pre-provisioning.

Figure 4:
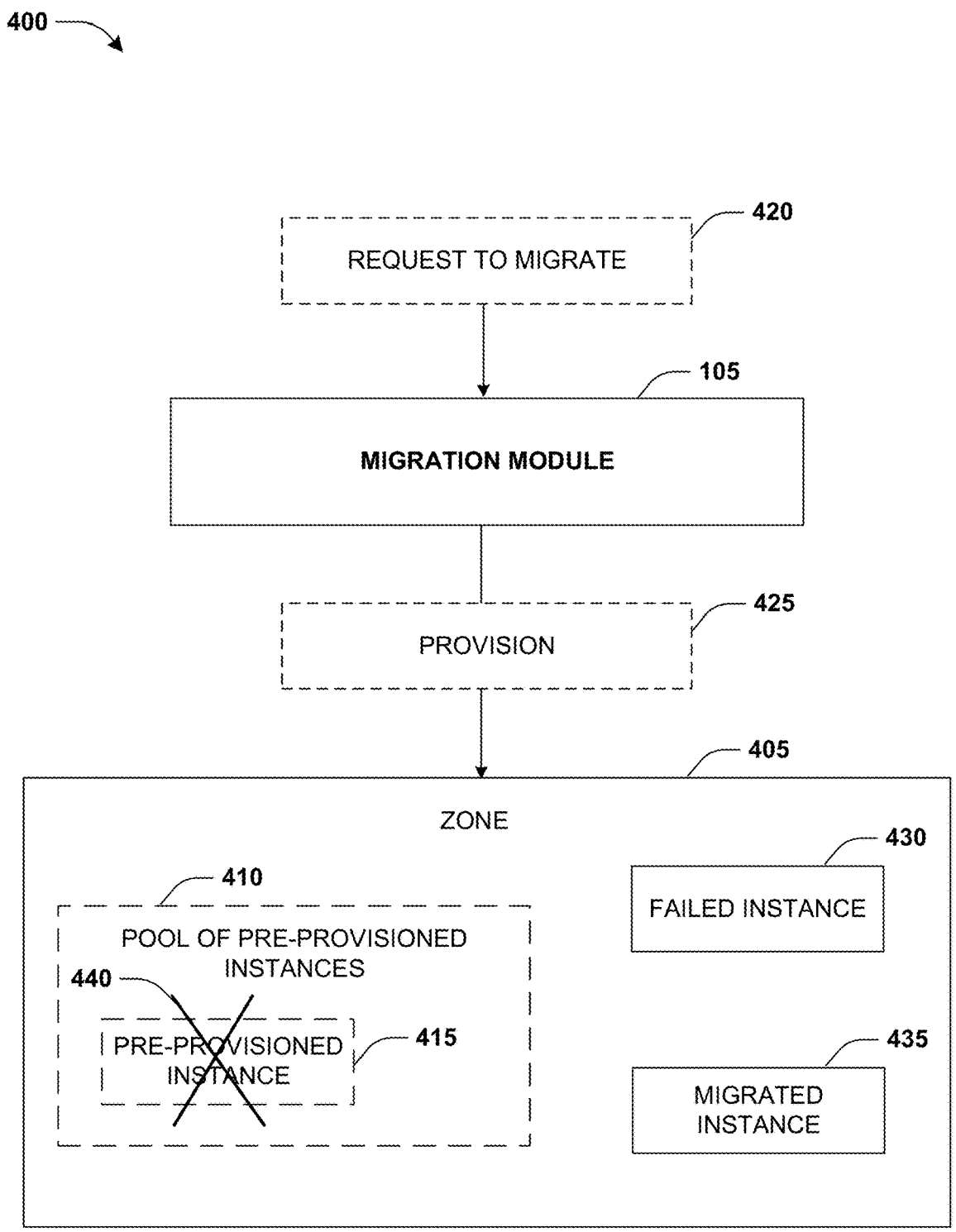
FIG. 4 illustrates an embodiment of a system associated with migrating an instance of a service, where the instance is migrated within a zone.

In one embodiment, instances can be migrated within the same zone 405, as illustrated by system 400 of FIG. 4. For example, instances are migrated within the same zone 405 to provide for high availability such as where an executing instance fails. This improves operation of the cloud computing environment because a migrated instance can be quickly and efficiently provisioned from a pre-provisioned instance to provide failover operation for a failed instance. For example, the migration module 105 receives a request 420 to migrate a failed instance 430 of a service, within the zone 405. Accordingly, the migration module 105 provisions 425 a pre-provisioned instance 415 of the service from a pool 410 of pre-provisioned instances for the service. The pre-provisioned instance 415 is provisioned 425 by executing executable code of the service that was proactively installed into the pre-provisioned instance 415. The executable code is executed using computing resources of the zone 405 assigned to the pre-provisioned instance 415. In this way, the pre-provisioned instance 435 is provisioned 425 as a migrated instance 435 to take over operation of the failed instance 430. In this way, the migrated instance 435 can process subsequent access requests for the service that were previously processed by the failed instance 430. Upon provisioning, the pre-provisioned instance 440 is removed from the pool 410 by removing the corresponding instance pointer from the collection of instance pointers (pointer list) assigned to the pool 410.

Figure 5:
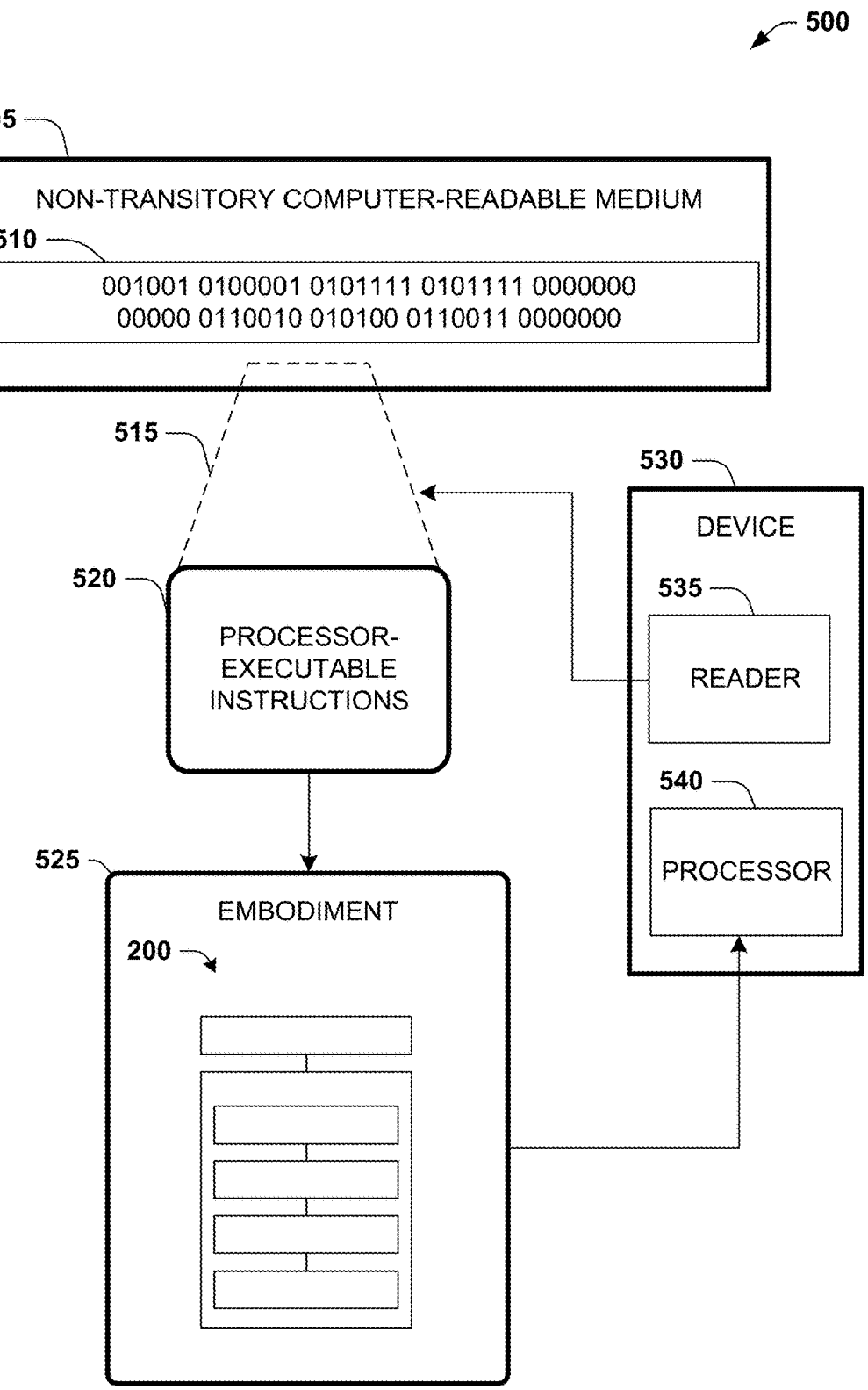
FIG. 5 illustrates an embodiment of a non-transitory computer-readable medium.

FIG. 5 is an illustration of one embodiment of a special purpose configuration 500 involving non-transitory computer-readable medium 505. In one embodiment, one or more of the components described herein are configured as program modules, such as the migration module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the migration module 105, stored in the non-transitory computer-readable medium 505, may be executed by the processor 540 as the processor-executable instructions 520 to perform an embodiment 525 of the method 200 of FIG. 2.

The non-transitory computer-readable medium 505 includes the processor-executable instructions 520 that when executed by a processor 540 cause performance of at least some of the functions and actions described herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, a solid-state drive, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
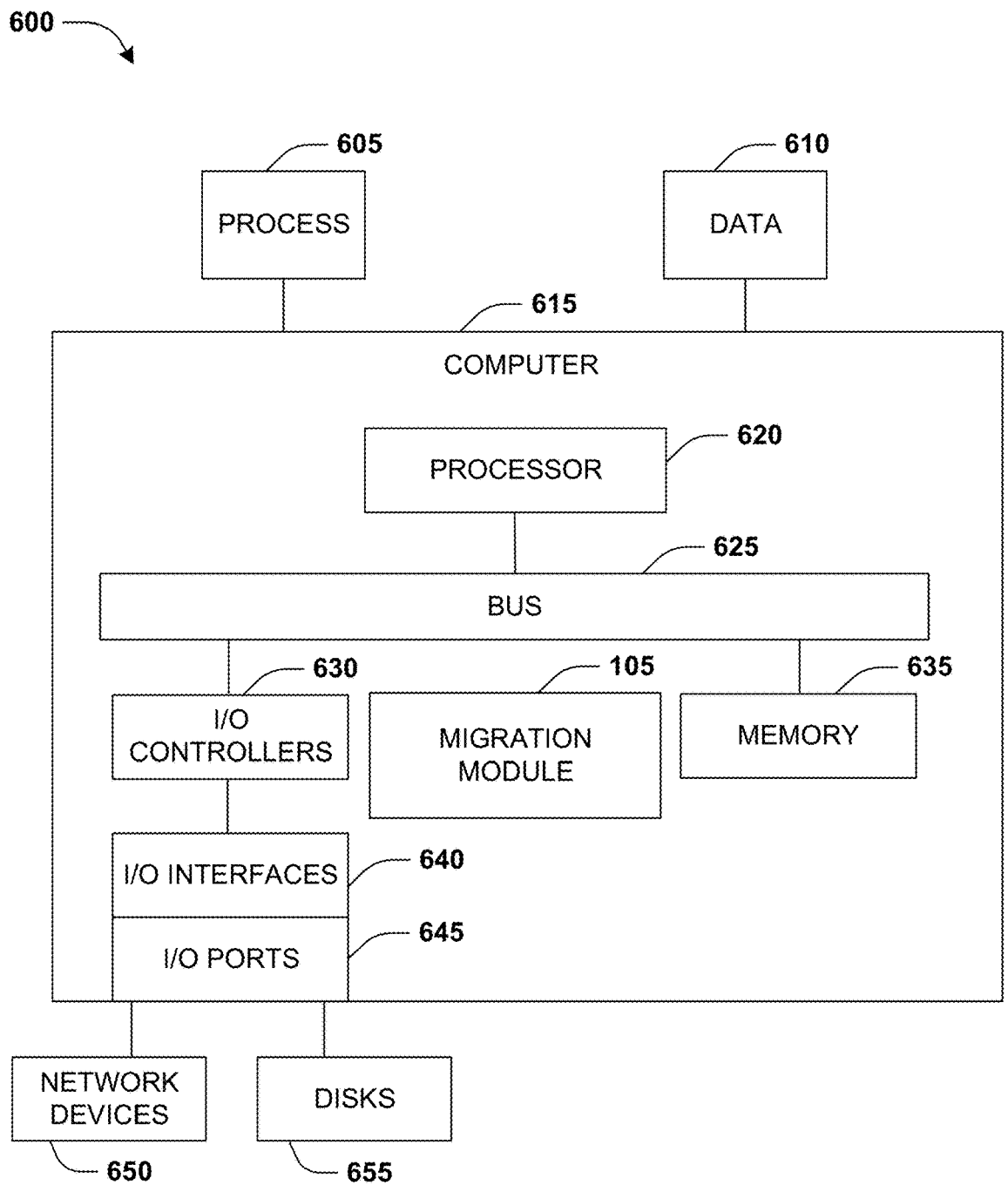
FIG. 6 illustrates an embodiment of a computing system configured with the example systems and/or methods disclosed.

FIG. 6 illustrates a special purpose configurations of a computing device 600 that is configured and/or programmed with one or more of the example systems and methods described herein, and/or equivalents. The computing device 600 may be the computer 615 that includes a specially programmed processor 620, a memory 635, and I/O ports 645 operably connected by a bus 625. In one embodiment, the computer 615 may include logic of the migration module 105 configured to facilitate the system 100 and/or the method 200 shown in FIGS. 1-2. In different embodiments, the logic of the migration module 105 may be implemented in hardware, a non-transitory computer-readable medium 605 with stored instructions, firmware, and/or combinations thereof. While the logic of the migration module 105 is illustrated as a hardware component, it is to be appreciated that in other embodiments, the logic of the migration module 105 could be implemented in the processor 620, stored in memory 635, or stored in disk 655.

In one embodiment, logic of the migration module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the migration module 105 may also provide means (e.g., hardware, non-transitory computer-readable medium 605 that stores executable instructions, firmware) for performing rule based source sequencing for allocation.

Generally describing an example configuration of the computer 615, the specially programmed processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote devices (e.g., the computer 615 may reside within a distributed computing environment to which clients may connect). Networks with which the computer 615 may interact include, but are not limited to, a local area network (LAN), a new area network (WAN), and other networks.

Figure 7:
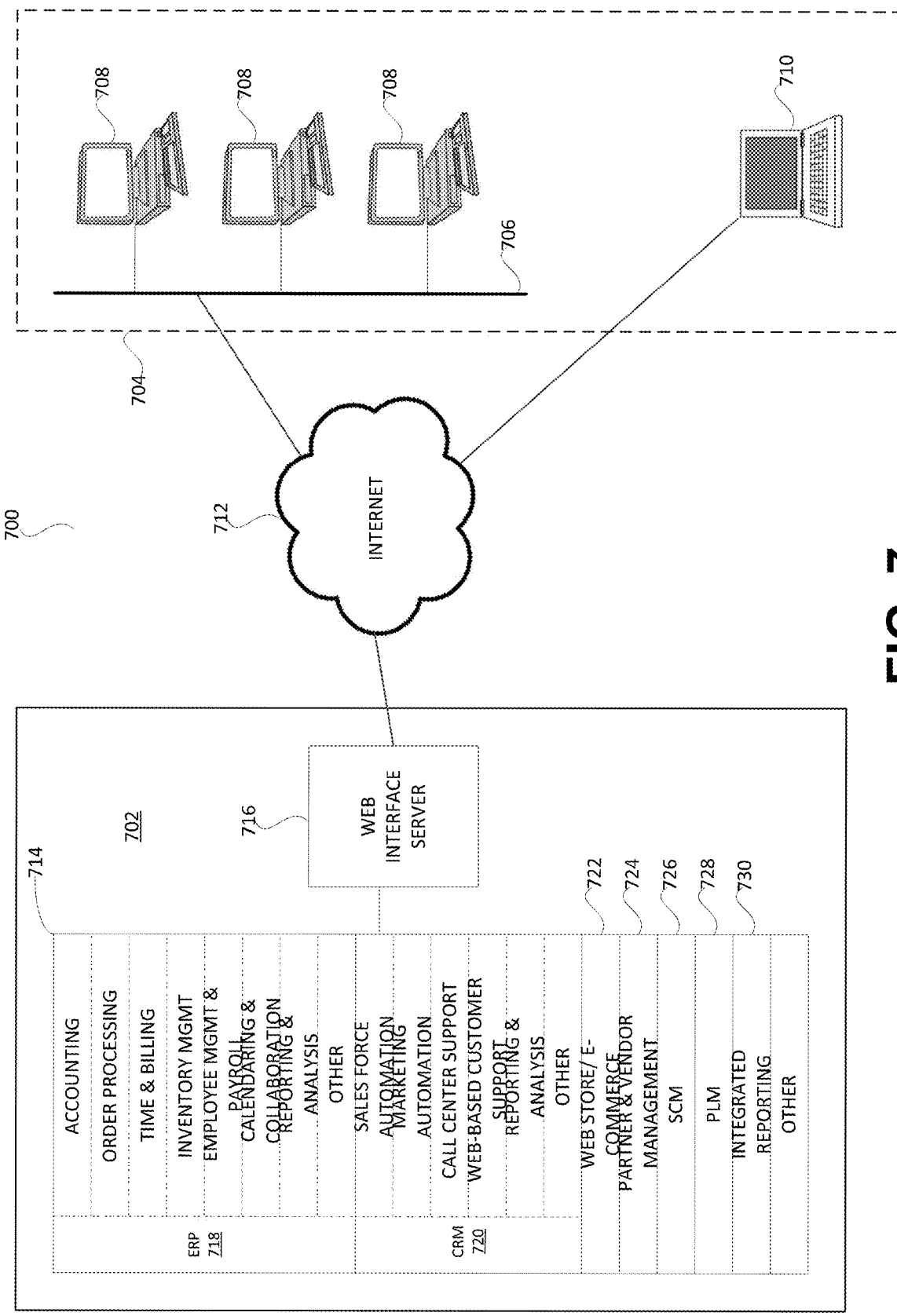
FIG. 7 illustrates an embodiment of an integrated business system and an enterprise network in which an embodiment of the invention may be implemented.

FIG. 7 is a diagram illustrating a system 700 in which an embodiment of the invention may be implemented. Enterprise network 704 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 704 is represented by an on-site local area network 706 to which a plurality of personal computers 708 are connected, each generally dedicated to a particular end user, such as a service agent or other employee (although such dedication is not required), along with an exemplary remote user computer 710 that can be, for example, a laptop computer or tablet computer of a traveling employee having internet access through a public Wi-Fi access point, or other internet access method. The end users (consumers) associated with computers 708 and 710 may possess an internet-enabled smartphone or other electronic device (such as a PDA, tablet, laptop computer) having wireless internet access or other synchronization capabilities. Users of the enterprise network 704 interface with the integrated business system 702 across the Internet 712 or another suitable communications network or combination of networks.

Integrated business system 702, which may be hosted by a dedicated third party, may include an integrated business server 714 and a web interface server 716, coupled as shown in FIG. 7. It is to be appreciated that either or both of the integrated business server 714 and the web interface server 716 may be implemented on one or more different hardware systems and components, even though represented as singular units in FIG. 7.

In a typical example in which system 702 is operated by a third party for the benefit of multiple account owners/tenants, each of whom is operating a business, integrated business server 714 comprises an ERP module 718 and further comprises a CRM module 720. In many cases, it will be desirable for the ERP module 718 to share methods, libraries, databases, subroutines, variables, etc., with CRM module 720, and indeed ERP module 718 may be intertwined with CRM module 720 into an integrated Business Data Processing Platform (which may be single tenant, but is typically multi-tenant).

The ERP module 718 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 720 may include, but is not limited to, a sales force automation (SFA) module, a marketing automation module, a contact list module (not shown), a call center support module, a web-based customer support module, a reporting and communication module, and other CRM-related modules.

The integrated business server 714 (or multi-tenant data processing platform) further may provide other business functionalities including a web store/eCommerce module 722, a partner and vendor management module 724, and an integrated reporting module 730. An SCM (supply chain management) module 726 and PLM (product lifecycle management) module 728 may also be provided. Web interface server 716 is configured and adapted to interface with the integrated business server 714 to provide one or more web-based user interfaces to end users of the enterprise network 704.

The integrated business system shown in FIG. 7 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote devices, and the software applications running on the remote devices, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 8:
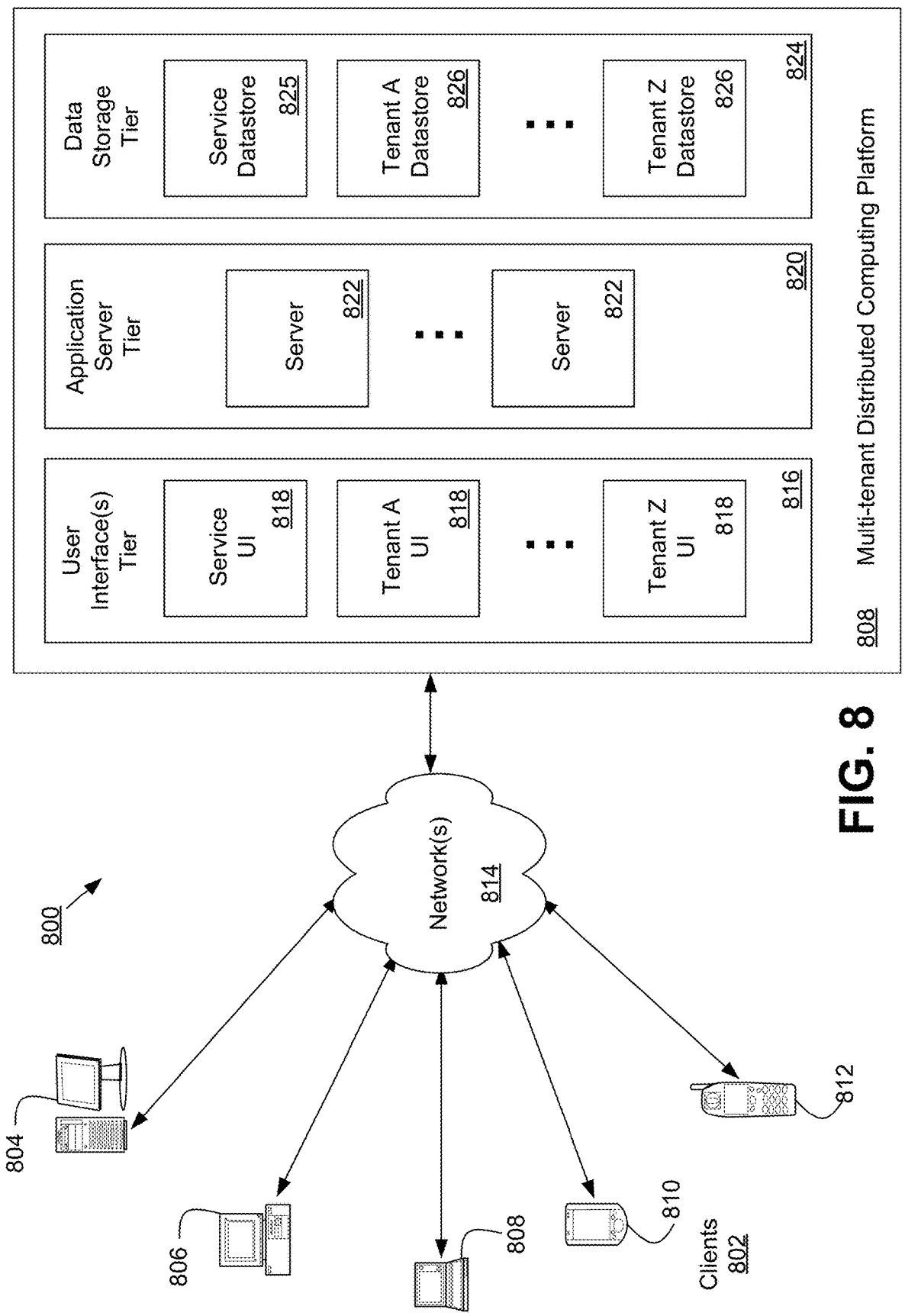
FIG. 8 illustrates an embodiment of a multi-tenant distributed computing service platform.

FIG. 8 is a diagram illustrating elements or components of an example operating environment 800 in which one or more embodiments of the disclosed system or method may be implemented. As shown, a variety of clients 802 incorporating and/or incorporated into a variety of computing devices may communicate with a distributed computing service/platform 808 through one or more networks 814. For example, a client may incorporate and/or be incorporated into a client application (e.g., software) implemented at least in part by one or more of the computing devices.

Examples of suitable computing devices include specially programmed or configured personal computers, server computers 804, desktop computers 806, laptop computers 808, notebook computers, tablet computers or personal digital assistants (PDAs) 810, smart phones 812, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 814 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 808 may include multiple processing tiers, including a user interface tier 816, an application server tier 820, and a data storage tier 824. The user interface tier 816 may maintain multiple user interfaces 818, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 824 may include one or more data stores, which may include a Service Data store 825 and one or more Tenant Data stores 826.

Each tenant data store 826 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 808 may be multi-tenant and service platform 808 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 822 that are part of the platform's Application Server Tier 820.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 808 of FIG. 8(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 822 that are part of the platform's Application Server Tier 820.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 808 of FIG. 8).

As noted with regards to FIG. 7, the integrated business system shown in FIG. 8 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
   maintain a first zone of computing resources used to host an instance of a service, wherein the instance executes executable code of an application stack of the service using the computing resources of the first zone;
   wherein one or more remote computers are assigned to access the instance of the service and wherein the one or more remote computers submit access requests for the service;
   route the access requests for the service to the instance within the first zone;
   maintain a second zone of computing resources used to host instances of services;
   construct a pre-provisioned instance of the service within the second zone, wherein the pre-provisioned instance comprises a computing environment of computing resources of the second zone and the application stack of the service; and
   in response to receiving a request to migrate the instance, reconstruct the instance by:
      provisioning the pre-provisioned instance as a migrated instance of the service within the second zone, wherein the migrated instance executes the executable code of the application stack using the computing resources of the second zone;
      rerouting subsequent access requests for the service within the first zone to the migrated instance within the second zone; and
      drain pending access requests being processed by the instance in the first zone by:
         (i) allowing the instance to complete the pending access requests; and
         (ii) after the pending access requests are completed, turn off access to a database comprising client data used by the instance in the first zone.

2. The non-transitory computer-readable medium of claim 1, wherein the instructions comprise instructions to:
   in response to routing the access requests to the migrated instance:
      determine that the instance in the first zone is marked for debugging and in response:
         (i) perform a debugging process upon the instance in the first zone; and
         (ii) in response to an expiration of a time period, decommission the instance by deallocating the computing resources of the first zone from the instance; and
      determine that the instance in the first zone is not marked for debugging and in response:
         decommission the instance by deallocating the computing resources of the first zone from the instance.

3. The non-transitory computer-readable medium of claim 1, wherein the instructions comprise instructions to:
   in response to routing the access requests to the migrated instance:
      disassociate the instance from client data stored within a computing environment; and
      associate the migrated instance with the client data for processing of the client data.

4. The non-transitory computer-readable medium of claim 1, wherein the instructions comprise instructions to:
identify a software upgrade for the service; and
implement the software upgrade upon the executable code within the pre-provisioned instance.

5. The non-transitory computer-readable medium of claim 1, wherein the instructions to provision the pre-provisioned instance comprise instructions to:
after turning off access by the instance to a database comprising client data
insert a database connection string of the instance into the migrated instance for accessing the database.

6. The non-transitory computer-readable medium of claim 1, wherein the instructions to provision the pre-provisioned instance comprise instructions to:
disable monitoring of resource usage by the instance; and
enable monitoring of resource usage by the migrated instance.

7. A computing system, comprising:
a processor connected to memory; and
a migration module stored on a non-transitory computer readable medium and configured with instructions that when executed by the processor cause the processor to:
maintain a first zone of computing resources used to host an instance of a service, wherein the instance executes executable code of an application stack of the service using the computing resources of the first zone;
wherein one or more remote computers are assigned to access the instance of the service and wherein the one or more remote computers submit access requests for the service;
route the access requests for the service to the instance within the first zone;
maintain a second zone of computing resources used to host instances of services;
construct a pre-provisioned instance of the service within the second zone, wherein the pre-provisioned instance comprises a computing environment of computing resources of the second zone and the application stack of the service; and
in response to receiving a request to migrate the instance, reconstruct the instance by causing at least the processor to:
provision the pre-provisioned instance as a migrated instance of the service within the second zone, wherein the migrated instance executes the executable code of the application stack using computing resources of the second zone;
route the access requests directed for the instance of the service within the first zone to the migrated instance within the second zone; and
drain pending access requests being processed by the instance in the first zone.

8. The computing system of claim 7, wherein the instructions comprise instructions that cause the processor to:
maintain the first zone within a first data center and the second zone within a second data center;
wherein the instructions to route the access requests to the migrated instance within the second zone comprise instructions that cause the processor to:
update a routing tier of the second data center to point to the migrated instance of the service for routing the access requests to the migrated instance within the second zone of the second data center;
update a routing tier of the first data center to stop pointing to the instance of the service for routing the access requests to the instance;
migrate client data processed by the instance from the first data center to the second data center;
update a database connection string of the migrated instance to point to the migrated client data within the second data center;
wherein the instructions to migrate comprise instructions that cause the processor to:
perform a mirroring operation to mirror the client data from the first data center to the second data center; and
in response to the mirroring operation completing, decommission storage of the client data by the first data center.

9. The computing system of claim 8, wherein the instructions to provision comprise instructions that cause the processor to:
transmit a notification of the migration to a monitoring module, wherein the notification instructs the monitoring module to stop monitoring resource usage by the instance of the first zone within the first data center and to start monitoring resource usage by the migrated instance of the second zone within the second data center.

10. The computing system of claim 8, wherein the instructions to route comprise instructions that cause the processor to:
update domain name system translation of an instance endpoint of the service to point to a load balancer of the second data center for routing the access requests to the migrated instance.

11. The computing system of claim 7, wherein the instructions comprise instructions that cause the processor to:
identify a set of instances of services that have a dependency upon the instance of the service; and
migrate the set of instances from the first zone to the second zone.

12. A computer-implemented method, the computer-implemented method involving a computing device comprising a processor, and the computer-implemented method comprising:
maintaining, by the processor, a zone of computing resources used to host an instance of a service, wherein the instance executes executable code of an application stack of the service using the computing resources of the zone;
wherein one or more remote computers are assigned to access the instance of the service and wherein the one or more remote computers submit access requests for the service;
routing, by the processor, the access requests for the service to the instance within the zone;
constructing, by the processor, a pre-provisioned instance of the service within the zone, wherein the pre-provisioned instance comprises a computing environment of computing resources of the zone and the application stack of the service, wherein the pre-provisioned instance is maintained within a non-execution state; and
in response to receiving a request to migrate the instance, reconstructing the instance by:
provisioning the pre-provisioned instance into an execution state as a migrated instance of the service, wherein the migrated instance executes the executable code of the application stack using computing resources of the zone;

rerouting the access requests to the migrated instance of the service; and draining pending access requests being processed by the instance in the zone by allowing the instance to complete the pending access requests.

13. The computer-implemented method of claim 12, further comprising:

after draining the pending access requests, decommissioning the instance by deallocating the computing resources from the instance.

14. The computer-implemented method of claim 12, further comprising:

determining that the instance is marked for debugging;

performing a debugging process upon the instance; and in response to an expiration of a time period, decommissioning the instance by deallocating the computing resources from the instance.

\* \* \* \* \*